United States Patent
Isaak (10) Patent No.: US 6,622,247 B1
(45) Date of Patent: Sep. 16, 2003

(54) METHOD FOR CERTIFYING THE AUTHENTICITY OF DIGITAL OBJECTS BY AN AUTHENTICATION AUTHORITY AND FOR CERTIFYING THEIR COMPLIANCE BY A TESTING AUTHORITY

(75) Inventor: James DeWitt Isaak, Hollis, NH (US)

(73) Assignee: Hewlett-Packard Development Company, LP, Houston, TX (US)

( * ) Notice: Subject to any disclaimer, the term of this patent is extended or adjusted under 35 U.S.C. 154(b) by 0 days.

(21) Appl. No.: 08/993,799

(22) Filed: Dec. 19, 1997

(51) Int. Cl.$^7$ ................................. H04L 9/00
(52) U.S. Cl. ............... 713/155; 713/156; 713/175; 713/176
(58) Field of Search ............. 380/23, 21; 713/155, 713/156, 168, 175, 176

(56) References Cited

U.S. PATENT DOCUMENTS

| | | | | |
|---|---|---|---|---|
| 4,405,829 A | * | 9/1983 | Rivest et al. | 178/22.1 |
| 5,079,707 A | * | 1/1992 | Bird et al. | 364/424.04 |
| 5,136,647 A | * | 8/1992 | Haber et al. | 380/49 |
| 2002/0112034 A1 | * | 8/2002 | Feik | 709/219 |

OTHER PUBLICATIONS

Kruckeberg, Certification of Software, Automatisierungstechnishe–Praxis vol 31, 9 pp. 439–444 1989.*
Newton, H. Newton's Telecomm Dictionary. 8$^{th}$ Edition. Flatiron Publishing. 1994. p. 553.*
Schneier, B. Handbook of Applied Cryptography. Second Edition. John Wiley and Sons. 1996. (CIP 1995). pp. 1, 2, 37–39, and 185–187.*
Willett, S. "Novell focuses on third–party products, improves testing process." Computer Reseller News. Jan. 2, 1995. Issue 611. p. 47.*
Anonymous Author. "FUD Finally Fades Into Oblivion." Data Communications. Dec. 1993. vol. 22, Iss. 18. p. 138. Abstract.*
Anonymous Author. "Printers Postscript Clones Face Compatibility Test Suites." InfoWorld. Oct. 10, 1988. vol. 10, Iss. 41. p. 31. Abstract.*
Anthony, Charles. "Testing Goes Automatic." Quality. Jan. 1986. vol. 25, Iss. 1. p. 54. Abstract.*
Witt, Clyde. "Emphasizing transport in transport packaging." Material Handling and Engineering. Jan. 1995. vol. 50, Iss. 1. p. 22.*
Lampson et al.; Authentication in Distributed Systems; Theory and Practice; Proceedings of the Thirteenth ACM Symposium on Operating Systems Principles; pp. 1–47; 1992.
Brownstein, Executive Director; Managing Access to Digital Information: An Approach Based on Digital Objects and Stated Operations; Cross–Industry Woriing Team Corporation for National Research Initiatives; pp. 1–27; 1997.

* cited by examiner

*Primary Examiner*—Gail Hayes
*Assistant Examiner*—James Seal
(74) *Attorney, Agent, or Firm*—Leah Sherry (57) ABSTRACT

A computerized method is provided for certifying a digital object. The digital object is uniquely identified with an identification. The identification is registered with a certification authority using a first public/private key exchange to receive a certificate of the digital object. Authenticity of the object is addressed by means of certification of the supplier's identity, in conjunction with integrity validation of the object. The digital object is tested to receive a compliance label using a second public/private key information exchange. The digital object is then distributed along with the certificate, and the label using a third public/private key information exchange. Ongoing confidence in object compliance is sustained by re-affirmation and/or notification mechanisms.

38 Claims, 5 Drawing Sheets

METHOD FOR CERTIFYING THE AUTHENTICITY OF DIGITAL OBJECTS BY AN AUTHENTICATION AUTHORITY AND FOR CERTIFYING THEIR COMPLIANCE BY A TESTING AUTHORITY

FIELD OF THE INVENTION

This invention relates generally to global information systems, and more particularly to certifying the authenticity and correctness of digital objects used in global information systems.

BACKGROUND OF THE INVENTION

Global information systems, such as the Internet, have greatly reduced the cost of producing and distributing digital information and services, i.e., content. For the purpose of storing, accessing, processing, and distributing, the content can be packaged as digital objects. The content of digital objects can be text, audio, video, images, software programs, digital scrip, and so forth. Supporting digital objects in global information systems may require additional infrastructure services such as repository management, data processing, and communication networks.

Conceptually, a digital object includes two main components, data and metadata. The data includes the content, and the metadata describes the content. Typically, the metadata contain a persistent unique identifier of the object. In addition, the metadata can also include access, ownership, and licensing information pertaining to the underlying content.

In order to interact with a digital object, the object must be processed. For example, if the object includes as content a video, the processing simply renders the video. Other types of processing can include transforming, distributing, replicating, compressing, repackaging, caching, communicating, aggregating, encrypting, brokering, billing, maintaining, and the like. Therefore, in some cases, it makes sense to include the processes, e.g., software programs, with the digital object.

It is desired to provide a method that can certify the authenticity and correctness of digital objects before they are used.

SUMMARY OF THE INVENTION

A computerized method is provided for certifying a digital object. The digital object is uniquely identified with an fingerprint identification. The identification is registered with a certification authority using a first public/private key exchange to receive a certificate of the digital object.

The digital object supplier identity is established though a certification authority. This can then be used to provide assurance of the authenticity of a digital object. The digital object is tested to receive a compliance label using a second public/private key exchange of the third party testing authority. The digital object is then distributed along with the certificate, and the label using a third public/private key exchange to consumers. Encoding/encryption methods are used to provide, for trusted information exchange in all of the above operations.

The consumer can then confirm the authenticity and correctness of the digital object. Based on this verification, suitability for consumption can be determined. After the digital object has been distributed, it is also possible to re-affirm the certification. Furthermore, third parties to the consumer, e.g., suppliers, certification authorities, testing authorities, and regulatory authorities, can revoke the certification.

DETAILED DESCRIPTION OF PREFERRED EMBODIMENTS

Figure 1:
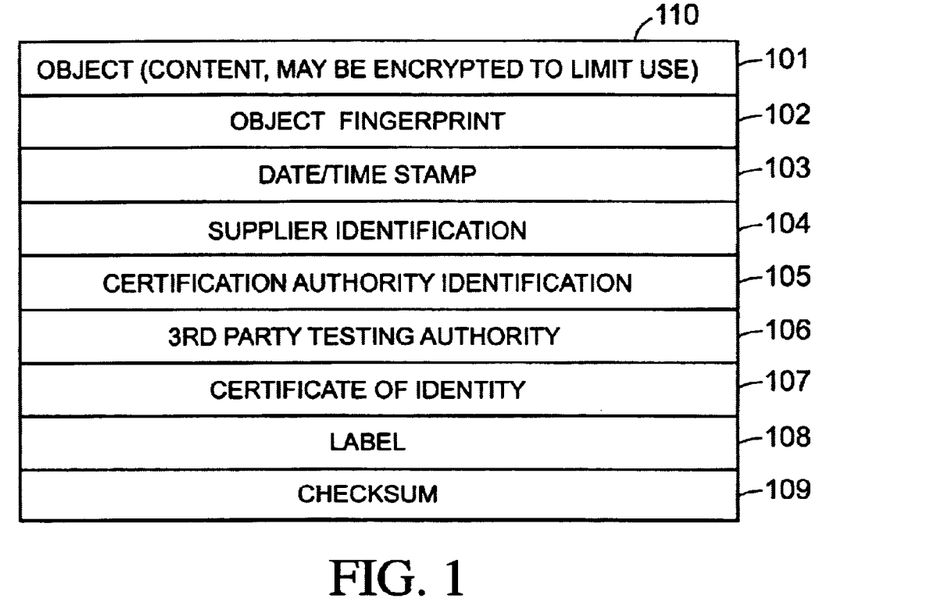
FIG. 1 is a block diagram of a data structure for storing and communicating a certified digital object according to the invention.
Figure 2:
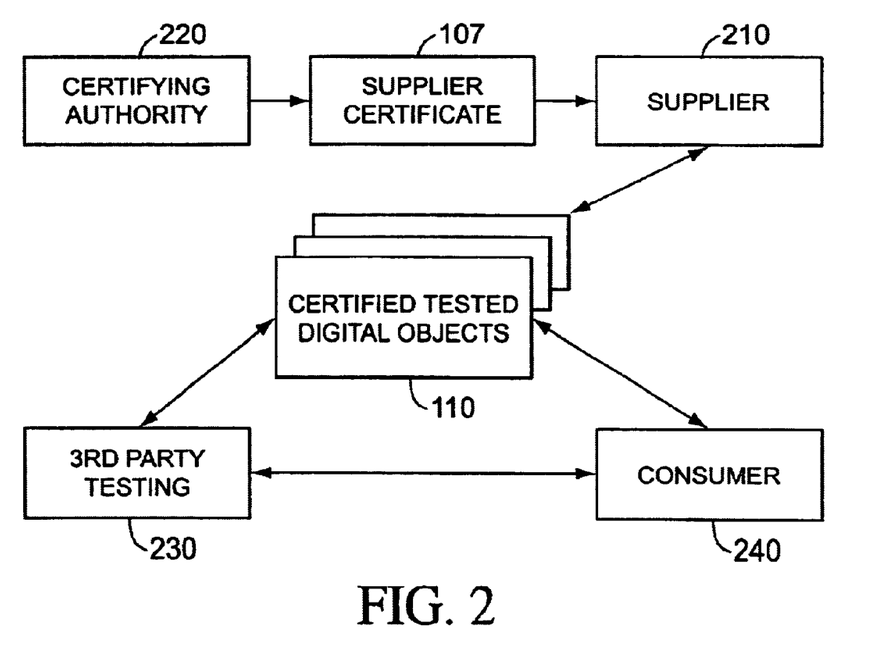
FIG. 2 a block diagram of distributed computer system for exchanging certified and tested digital objects.
Figure 6:
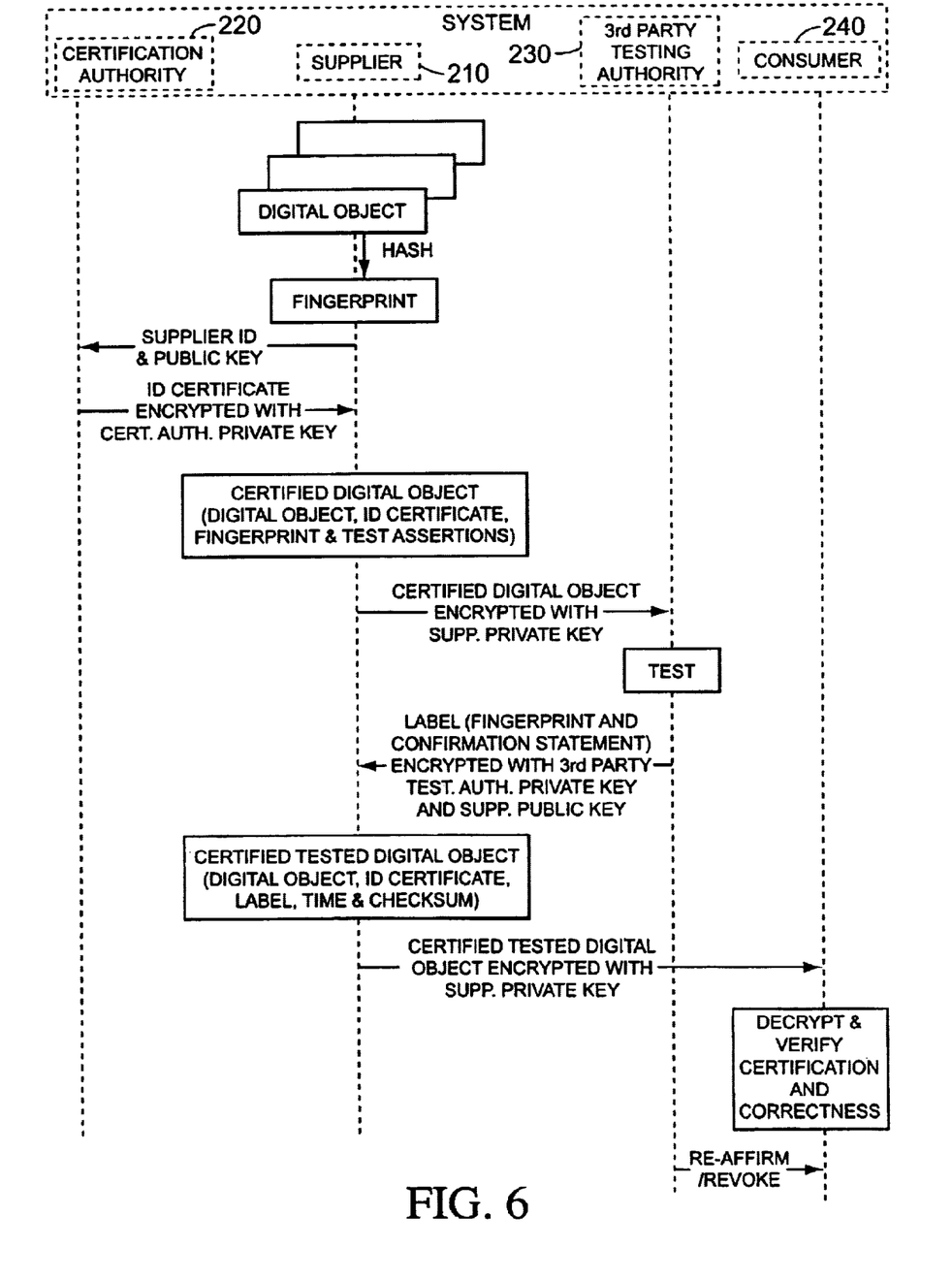
FIG. 6 is a flow diagram for certifying and confirming the authenticity and correctness of digital objects distributed in the system.

FIG. 1 shows a data structure 110 for storing and communicating a digital object, and metadata information about the object. FIG. 2 shows parties connected in a massively distributed network that are involved in handling digital objects as described herein. To better understand the overall scheme of handling the digital objects, FIG. 6 is a flow diagram that illustrates how certifying and confirming the authenticity and correctness of digital objects distributed is performed in the system. As will be later explained in more detail, the interaction between a supplier 210 a certification authority 220, a testing authority 230 and a consumer 240, includes a number of exchanges and some processing. As shown, processing includes for example creating a fingerprint associated with a digital object that is to be distributed by the supplier 210. Processing also includes certifying the digital object, testing the digital object and confirming the authenticity and correctness of that digital object. Exchanges include for example the certification authority 220 providing to the supplier 210 an identification (ID) certificate. Exchanges include also sending from the supplier 210 to the 3rd party testing authority 230 a certified copy of the digital object (certified digital object) together with test assertions and the fingerprint. The exchanges further include sending from the supplier 210 to the consumer 240 a certified tested copy of the digital object (certified tested digital object). The following description in conjunction with FIGS. 1–5 provides a more detailed narration of the above described system and method.

The data structure 110 includes the digital object 101, which may be encoded or encrypted to control use, the object fingerprint 102, a time/date stamp 103, identification and other information about a supplier 104, identification and other information about a certificate authority 105, identification and other information about a 3rd party testing authority 106, a certificate of identity from the certificate authority 107, a label from the 3rd party testing authority 108, and a checksum 109.

The digital object can be software programs, multimedia, or any other type of consumable data.

The fingerprint, 102, is generated by a process that can be applied to the object resulting in a bit pattern or value which is highly dependent on the object's content with the additional property that it is highly unlikely that objects having different content have the same fingerprint. Fingerprinting allows the almost certainly unique identification and integrity validation of objects without central management of identification information, a highly desirable attribute in a globally distributed environment.

FIG. 2 shows a first party, for example a content supplier 210 that can generate digital objects 101 certified and tested as described below. The supplier 210 can be a software or multimedia vendor. The supplier 210 obtains one or more supplier identity certificates 107 from certifying authorities 220. A certifying authority can be a bank, government agency, or other trusted, publicly accessible entity.

The authority certifies the identity of the supplier, which is an essential step in establishing the authenticity of a digital object. The supplier 210 then provides the digital object 101 to a 3rd party testing authority 230, along with a statement of the assertions the supplier would like to make about the correctness of the object. Correctness assertions might include, but are not limited to, statements about the operating environment, required resources, and/or security policy requirements.

The 3rd party organization 230 applies manual and/or automated mechanisms to verify the correctness of these assertions, and provides a label 108 back to the supplier which is explicitly tied to the fingerprint identity of the object.

The supplier 210 then combines the digital object with the identifying metadata (including the authenticity certificate and the label) 110 for delivery to the consumer.

The consumer 240 then uses the metadata to evaluate the object in relationship to their needs, environment and policies. This may entail additional, or ongoing interaction with the 3rd party testing authority 230, to ensure that the object continues to be correct. Some forms of correctness may not be detectable with the tests applied by the 3rd party, and therefor information about subsequent failures may be important to the consumer.

Figure 3:
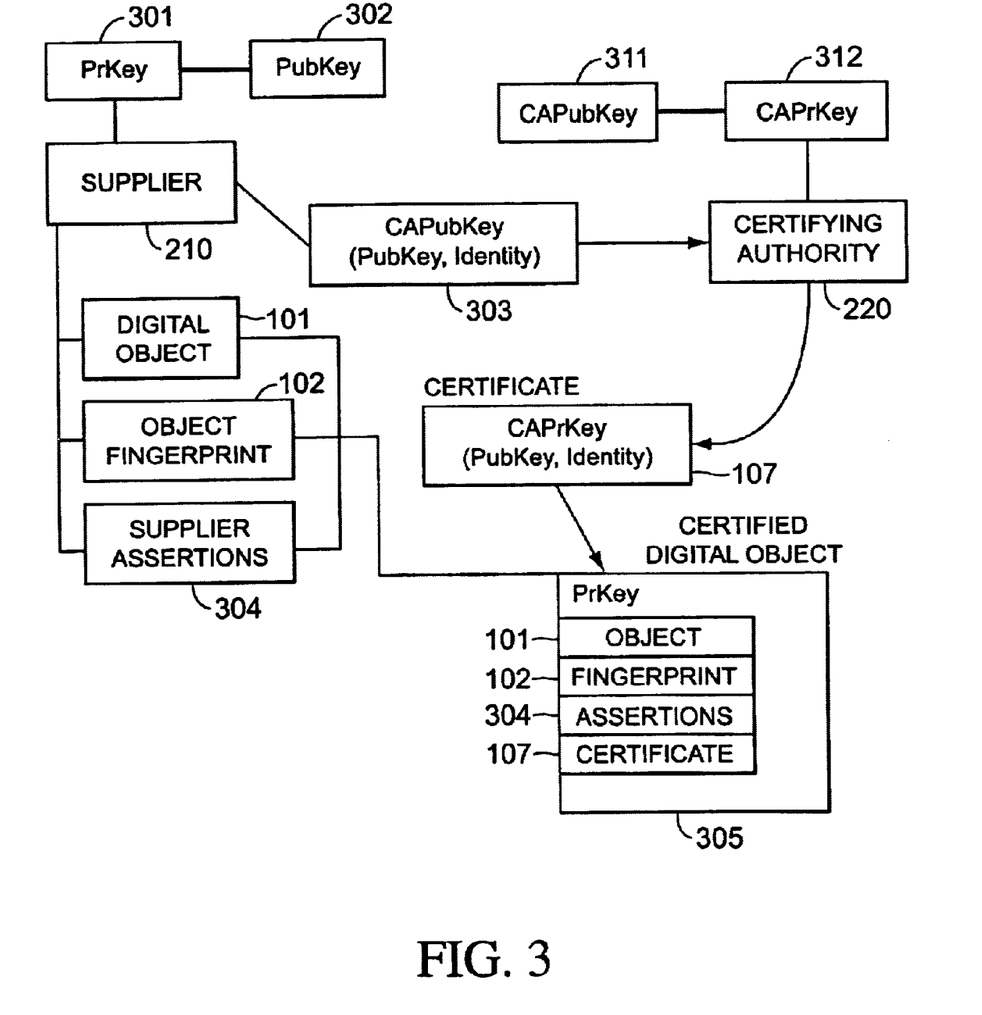
FIG. 3 is a flow diagram of method steps for certifying a digital object.

The steps of the certification process according to the invention are described with reference to FIG. 3. The supplier has one or more methods of trusted information exchange available. Here, public/private key encryption is used as the example, with the supplier having a public key 302 and a private key 301 that can be used to encrypt/decrypt data, which ever is used to encrypt the data, the other is required to decrypt it.

Using the public key 311 of a certifying authority 220, the supplier provides that authority with their public key, and other identifying information. The certifying authority applies their processes to verify that this supplier is the entity they claim to be, and then provides back a certificate 107.

This certificate incorporates the public key of the supplier 302, identifying information about the supplier and other information as determined by the certificate authority 220, all of which is encrypted using the certifying authority's private key 312. The resulting certificate 107, can be decrypted by anyone with access to the certifying authority's public key (which is expected to be publicly known and widely available).

Since this certificate 107 can only be decrypted with the public key 311 of the certificate authority 220, which means it was encrypted by their private key 312, the contents can be trusted to have been provided by that authority 220.

The supplier 210 then can apply this certificate to any digital object as an indication of the identity of the supplier. By combining this certificate 107, with a digital object 101, and a finger print of the digital object 102, and whatever assertions that the supplier wishes to make about the object 304 into a certified digital object 305. This will typically be encrypted using the suppliers private key 301 (so any interested party can decrypt it with the suppliers public key 302.)

A recipient of a certified digital object 305, can have confidence in the authenticity of the object. This can be established by decrypting the certified object with the public key of the supplier 302, decrypting the certificate with the public key 311 of the certificate authority 220, and comparing the public key for the supplier from the certificate authority with that used to decrypt the package.

Confirmation can be acquired from the certifying authority 220 that the certificate is still valid if that is appropriate. The fingerprint process can then be applied to the object 101, to verify that the object matches the fingerprint 102 in the certified digital object package. However, this does not assure that the object will conform to the assertions 304 made by the supplier.

Figure 4:
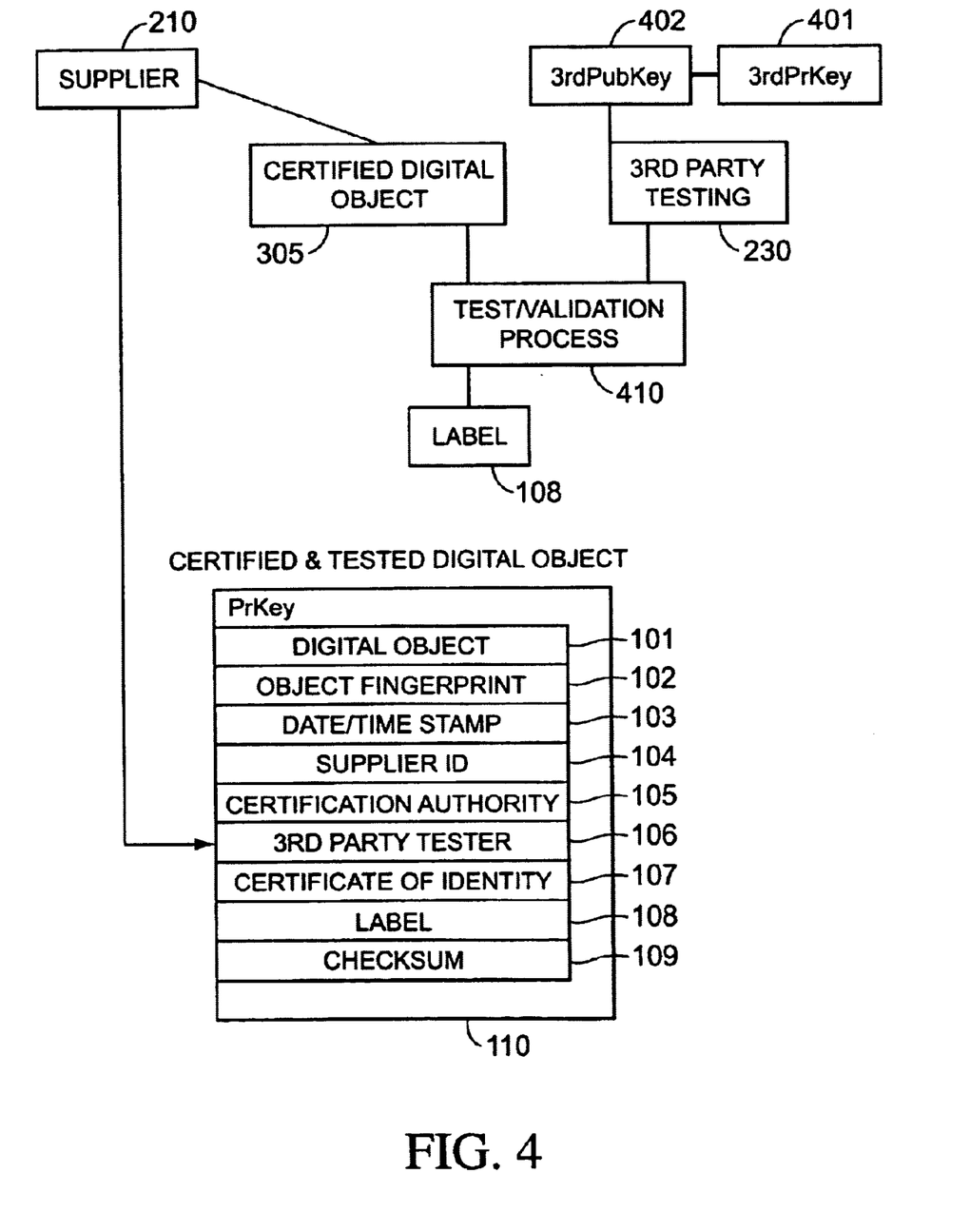
FIG. 4 is a flow diagram of method steps for testing a certified digital object.

Steps of the testing process according to the invention are described with reference to FIG. 4. The supplier 210 provides the certified digital object 305 to a 3rd party testing authority 230. This may be done by encoding the certified object with the private key of the supplier 301, or the public key of the 3rd party testing authority 402, or a combination to ensure the contents are not disclosed to any other parties.

The testing authority 230 can decrypt the package using their private key and/or the suppliers public key, and verify the authenticity as indicated above. The testing authority 230 then applies whatever series of tests 410 are applicable for the assertions 304 made by the supplier. The results are combined into a label 108, which would contain the object fingerprint 102, and the confirmation statements that the testing authority 230 has determined with respect to the digital object 101.

These statements may indicate both characteristics of the object 101, and also information about the method of testing applied, since consumer policies may require specific test methods as well as specific characteristics. The label would be encrypted by the testing authority 230, using their private key 401, and also the public key 302 of the supplier 210 to ensure that the authenticity of the results were retained, and also that they were only available to the supplier.

The certificate of supplier identity 107, and the label with tested object characteristics 108 are both retained in the form encrypted by the authority (certificate authority 220 for the certificate, encrypted by their private key 312; and the testing authority 230 for the label, encrypted by their private key 401).

These are provided to consumers in this encrypted form so the public key 311 of the certification authority 220, and public key 402 of the testing authority 230 can be used to authenticate the integrity of these certifications. (Of course the supplier 210 can also decrypt these to verify that these certifications are in good order with respect to their business requirements.)

The supplier 210 then combines the object 101, its fingerprint 102, date/time information 103, identification information about the supplier 104, the certificate authority 105, and the testing authority 106, as well as the identity certificate 107 and the label 108 into a package with checksum 109 for distribution. This is a certified and tested digital object 110.

Figure 5:
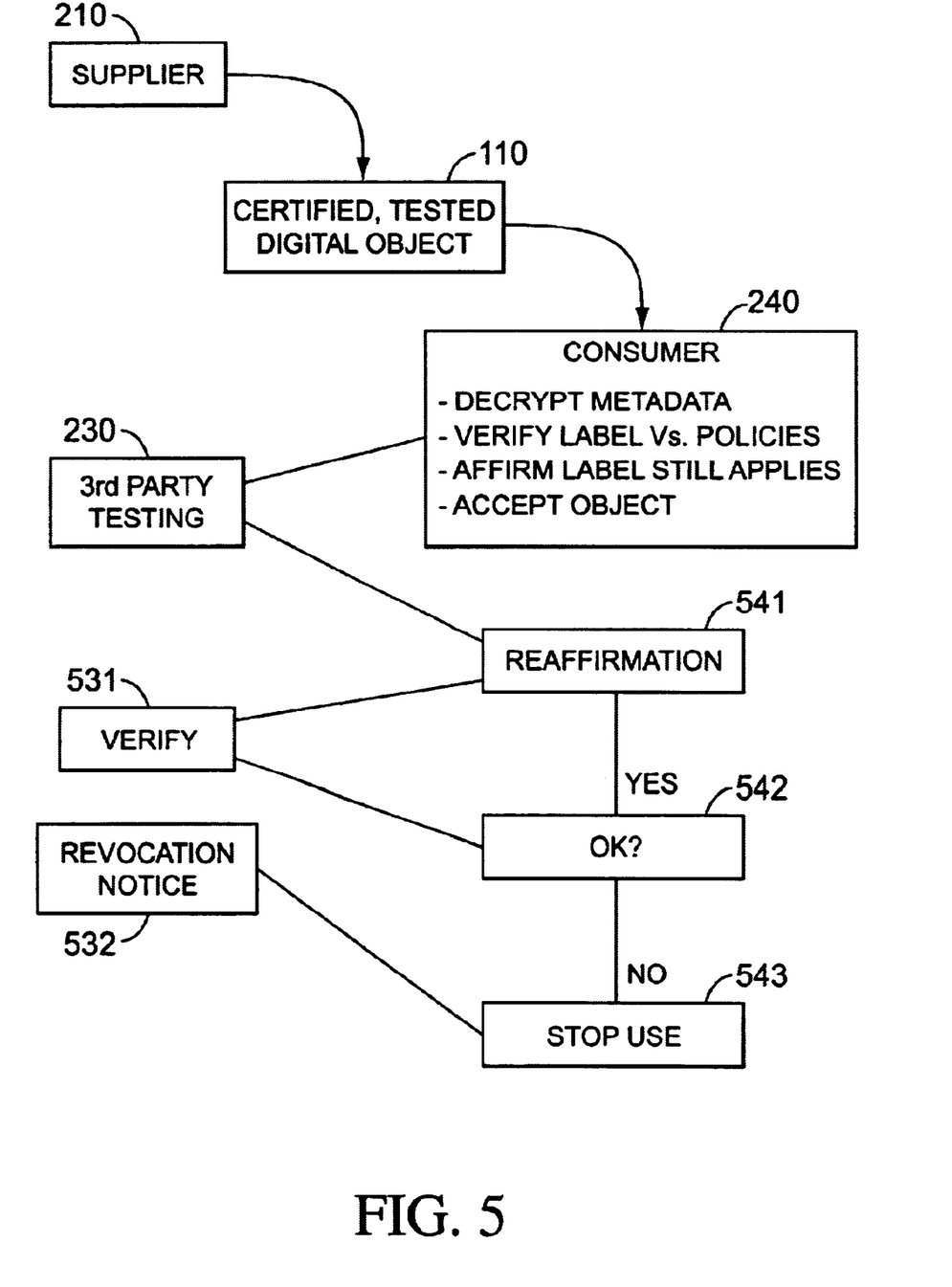
FIG. 5 is a flow diagram of step for distributing and confirming a certified and tested digital object.

The steps for distribution, acceptance, and continued confidence in a digital object according to the invention are described with reference to FIG. 5. The supplier 210 makes the certified and tested digital object 110 available to consumers via appropriate mechanisms (media distribution, online, etc.)

The consumer 240, obtains a copy of the object 110, and verifies it's authenticity. This entails decrypting the object and metadata 110 using the public key of the supplier 302, verifying the identity of the supplier with the certificate information 107, decrypting this with the public key 311 of the certifying authority, and verifying the label contents 108, by decryption using the public key 402 of the testing authority.

The integrity of the object 101, can be verified with the fingerprint identification 102. The label metadata can then be compared with the relevant policies, and operating environment of the consumer. Additional confidence in the correctness of the object can be obtained by affirmation by the testing authority 230. Once the object authenticity and correctness is verified in accordance with the consumer's policies, the object can be accepted. This process may involve additional'steps with the supplier to obtain digital keys required for use of the object, and complete any contractual arrangements.

Once the object 101 is put into use, consumer 240 policies may require that regular re-affirmation 541 be initiated with the testing authority 230 to obtain verification 531 that the object is still correct with respect to the policies of the consumer. The testing authority 230 may also provide a service to consumers 240 notifying them 532 of revocation of all or part of the label test characteristics. The results of a verification 531 or revocation 532 may result in the consumer 532 in determining that it is required to stop using the digital object 543.

It is understood that the above described embodiments are simply illustrative of the principles of the invention. Various other modifications and changes may be made by those skilled in the art which will embody the principles of the invention an fall within the spirit and scope thereof.

I claim:

1. A computerized method comprising the steps of:
   receiving an identity certificate from a certifying authority, the identity certificate being encrypted;
   generating a fingerprint corresponding to a digital object;
   associating the identity certificate with the generated fingerprint and the digital object;
   providing the identity certificate, the generated fingerprint and the digital object to a testing authority;
   providing testing assertions relating to the digital object to the testing authority;
   receiving a testing label from the testing authority that is associated with the generated fingerprint, the testing label being encrypted and including testing results corresponding to the digital object; and
   providing the testing label, the identity certificate and the digital object to a consuming party;
   whereby the consuming party can decrypt the identity certificate and the testing label and thereby verify the information contained therein.

2. The computerized method of claim 1, further comprising the step of:
   encrypting the digital object prior to providing the digital object to the testing authority.

3. The computerized method of claim 2 further comprising the step of:
   encrypting the fingerprint
      wherein the generated fingerprint provided to the testing authority includes the encrypted fingerprint.

4. The computerized method of claim 3, further comprising the step of:
   receiving a supplemental testing label from the testing authority; and
   providing the received supplemental testing label to the consuming party.

5. The computerized method of claim 3, wherein the digital object includes metadata, the method further comprising the step of:
   including the received identity certificate with the metadata.

6. The computerized method of claim 5, further comprising the step of:
   including the testing label with the metadata.

7. The computerized method of claim 6, wherein the testing label includes at least a representation of the generated fingerprint.

8. A computer system for providing a certified digital object, the computer system comprising:
   a processor; and
   a memory device connected to the processor, the memory device including a plurality of instructions readable by the processor to cause the processor to:
      receive an identity certificate from a certifying authority, the identity certificate being encrypted;
      generate a fingerprint corresponding to a digital object;
      associate the identity certificate with the generated fingerprint and the digital object;
      provide the identity certificate, the generated fingerprint and the digital object to a testing authority;
      provide testing assertions relating to the digital object to the testing authority;
      receive a testing label from the testing authority that is associated with the generated fingerprint, the testing label being encrypted and including testing results corresponding to the digital object; and
      provide the testing label, the identity certificate and the digital object to a consuming party;
   whereby the consuming party can decrypt the identity certificate and the testing label and thereby verify the information contained therein.

9. The computer system of claim 8, further comprising a plurality of instructions readable by the processor to thereby cause the processor to:
   initiate encryption of the digital object prior to providing the digital object to the testing authority.

10. The computer system of claim 8, further comprising a plurality of instructions readable by the processor to thereby cause the processor to:
    initiate encryption of the fingerprint:
       wherein the generated fingerprint provided to the testing authority includes the encrypted fingerprint.

11. The computer system of claim 8, further comprising a plurality of instructions readable by the processor to thereby cause the processor to:
    receive a supplemental testing label from the testing authority; and provide the received supplemental testing label to the consuming party.

12. The computer system of claim 8, wherein the digital data includes metadata, the computer system further comprising a plurality of instructions readable by the processor to thereby cause the processor to:

include the received identity certificate with the metadata.

13. The computer system of claim 12, further comprising a plurality of instructions readable by the processor to thereby cause the processor to:

include the testing label with the metadata.

14. The computer system of claim 8, wherein the testing label includes at least a representation of the generated fingerprint.

15. A computer system for providing a digital object that is certified, the digital object including metadata, the computer system comprising:

a monitor for displaying images;

a processor connected to the monitor; and a memory device connected to the processor, the memory device including a plurality of instructions readable by the processor to cause the processor to:

receive an identity certificate from a certifying authority, the identity certificate being encrypted;

include the received identity certified with the digital object;

generate a fingerprint corresponding to at least a portion of the digital object;

associate the identity certificate with the generated fingerprint and the digital object;

include the fingerprint with the metadata;

provide the digital object to a testing authority;

provide testing assertions relating to the digital object to the testing authority;

receive a testing label from the testing authority that is associated with the generated fingerprint, the testing label being encrypted and including testing results corresponding to the digital object; and provide the testing label and the digital object to a consuming party;

whereby the consuming party can decrypt the identity certificate and the testing label and thereby verify the information contained therein.

16. The computer system of claim 15, further comprising a plurality of instructions readable by the processor to thereby cause the processor to:

include the testing label with the metadata.

17. A computer system for certifying and confirming the authenticity and correctness of a digital object distributed in the computer system, comprising:

a supplier capable of creating a fingerprint which is identified with the digital object;

a certification authority;

a testing authority;

one or more consumers; and an interconnection between the supplier and the certification authority, the testing authority and the one or more consumers, the interconnection allowing the supplier to receive an identity certificate from a certification authority, the identity certificate being encrypted, send to the testing authority a certified digital object which is encrypted and includes the digital object, the identity certificate, the fingerprint and test assertions, receive from the testing authority a label which is encrypted and includes the fingerprint and a confirming statement expressing test results, and send to the one or more consumers a certified tested digital object that is encrypted and includes the digital object, the fingerprint, the identity certificate and the label, wherein the one or more consumers are capable of using the certified tested digital object to verify the authenticity and correctness of the digital object.

18. A computer system as in claim 17, wherein the computer system is a distributed computer system.

19. A computer system as in claim 17, wherein the computer system is a global information system.

20. A computer system as in claim 17, wherein the computer system is a networked system that can include the Internet in order to form a globally distributed environment.

21. A computer system as in claim 17, wherein the interconnection is a network that can include the Internet.

22. A computer system as in claim 17, wherein the interconnection allows additional or ongoing interaction between the one or more consumers and the testing authority in order to obtain a re-affirmation of the digital object correctness.

23. A computer system as in claim 17, wherein the encrypted identity certificate is produced using a certification authority private key.

24. A computer system as in claim 17, wherein the encrypted certified digital object is produced using a supplier private key.

25. A computer system as in claim 17, wherein the encrypted label is produced using a testing authority private key and a supplier public key.

26. A computer system as in claim 17, wherein the encrypted certified tested digital object is produced using the supplier private key.

27. A method for certifying and confirming the authenticity and correctness of a digital object distributed in a computer system, comprising:

providing an interconnection between a supplier and a certification authority, a testing authority and one or more consumers;

creating, by the supplier, a fingerprint which is identified with the digital object;

receiving by the supplier from the certification authority an identity certificate which is encrypted;

sending by the supplier to the testing authority a certified digital object which is encrypted and includes the digital object, the identity certificate, the fingerprint and test assertions;

receiving by the supplier from the testing authority a label which is encrypted and includes the fingerprint and a confirming statement expressing the test results;

sending by the supplier to the one or more consumers a certified tested digital object that is encrypted and includes the digital object, the fingerprint, the identity certificate and the label; and verifying, by the one or more consumers, the authenticity and correctness of the digital object using the certified tested digital object.

28. A method as in claim 27, wherein the computer system includes a network that facilitates the interconnection, the network can include the Internet in order to form a globally distributed environment.

29. A method as in claim 27, further comprising:

additional or ongoing interaction between the one or more consumers and the testing authority in order to obtain a re-affirmation of the digital object correctness.

30. A method as in claim 27, wherein the encrypted identity certificate is produced using a certification authority private key.

31. A method as in claim 27, wherein the encrypted certified digital object is produced using a supplier private key.

32. A method as in claim 27, wherein the encrypted label is produced using a testing authority private key and a supplier public key.

33. A method as in claim 27, wherein the encrypted certified tested digital object is produced using the supplier private key.

34. A method as in claim 27, wherein the certified tested digital object can further include a check sum and date/time stamp.

35. A method as in claim 27, wherein the fingerprint is a bit pattern that is uniquely identified with the digital object.

36. A method as in claim 27, wherein the verifying by the one or more consumers includes
   decrypting the certified tested digital object using the supplier public key,
   decrypting the identity certificate using a certification authority public key,
   decrypting the label using a testing authority public key,
   creating a hash of the digital object, and
   comparing the hash against the fingerprint.

37. A method for certifying and confirming the authenticity and correctness of a digital object distributed in a computer system, comprising:
   instantiating a fingerprint process respecting the digital object to produce a fingerprint identified with the digital object;
   instantiating a certification process respecting the digital object and the supplier of the digital object, the certification process including communications between the supplier and a certification authority that produces a supplier identity certificate;
   instantiating, at a testing authority, a testing process that produces based on test assertions respecting the digital object a label associated with the fingerprint;
   making the digital object available from the supplier to a consumer via a distribution mechanism, having been certified and tested by the testing and certification processes, the digital object is distributed in association with the supplier identity certificate, the fingerprint and the label;
   obtaining a copy, by the consumer, of the certified tested digital object; and
   verifying, by the consumer, the copy of the certified tested digital object.

38. A method as in claim 37, wherein the verifying by the consumer includes
   decrypting the copy of the certified tested digital object using a supplier public key,
   decrypting the supplier identity certificate using a certification authority public key,
   decrypting the label using a testing authority public key,
   creating a hash of the digital object, and
   comparing the hash against the fingerprint.

* * * * *